(12) United States Patent
Vajravel et al.

(10) Patent No.: US 10,402,364 B1
(45) Date of Patent: Sep. 3, 2019

(54) READ-AHEAD MECHANISM FOR A REDIRECTED BULK ENDPOINT OF A USB DEVICE

(71) Applicant: Dell Products L.P., Round Rock, TX (US)

(72) Inventors: Gokul Thiruchengode Vajravel, Rayasandra Benjalaru (IN); Ankit Kumar, Deoghar (IN)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 16/057,665

(22) Filed: Aug. 7, 2018

(51) Int. Cl.
G06F 13/20 (2006.01)
G06F 13/42 (2006.01)
H04L 29/08 (2006.01)
G06F 9/455 (2018.01)

(52) U.S. Cl.
CPC ...... G06F 13/4282 (2013.01); G06F 9/45558 (2013.01); H04L 67/141 (2013.01); *G06F 2213/0042* (2013.01)

(58) Field of Classification Search
CPC ............ G06F 13/4282; G06F 9/45558; G06F 2213/0042; H04L 67/141
See application file for complete search history.

(56) References Cited

U.S. PATENT DOCUMENTS

| | | | | |
|---|---|---|---|---|
| 8,010,630 B2* | 8/2011 | Barreto | ............. | H04L 29/08846 709/219 |
| 10,152,402 B2* | 12/2018 | Petrick | ................ | G06F 11/3051 |
| 2009/0222841 A1* | 9/2009 | Mirajkar | ............... | G06F 13/102 719/321 |
| 2012/0210027 A1* | 8/2012 | Intrater | ................... | G06F 3/061 710/74 |
| 2013/0019304 A1* | 1/2013 | Cai | ......................... | H04M 1/66 726/16 |
| 2017/0060802 A1* | 3/2017 | Venkatesh | ........... | G06F 13/4072 |
| 2017/0109301 A1* | 4/2017 | Venkatesh | ............... | G06F 13/20 |
| 2017/0339234 A1* | 11/2017 | Vajravel | ................ | H04L 67/141 |
| 2018/0232293 A1* | 8/2018 | Petrick | ................ | G06F 11/3051 |

* cited by examiner

*Primary Examiner* — Jing-Yih Shyu
(74) *Attorney, Agent, or Firm* — Kirton McConkie; Brian Tucker

(57) ABSTRACT

A read-ahead mechanism is provided for a redirected Bulk-In endpoint of a USB device. When a USB device is redirected to a server, an agent running on the server can evaluate the USB device's descriptors to determine whether it has any Bulk-In endpoints and whether any Bulk-In endpoint is part of a mass storage interface. For any Bulk-In endpoint that is not part of a mass storage interface, the agent can create a circular buffer and commence originating bulk read requests on the server and then redirecting the bulk read requests to a client-side proxy for delivery to the Bulk-In endpoint. The agent can then store the data it obtains from these bulk read requests in the circular buffer. By repeatedly sending the bulk read requests to the Bulk-In endpoint, the agent ensures that data will be read from the Bulk-In endpoint in a timely manner.

20 Claims, 12 Drawing Sheets

US 10,402,364 B1

READ-AHEAD MECHANISM FOR A REDIRECTED BULK ENDPOINT OF A USB DEVICE

CROSS-REFERENCE TO RELATED APPLICATIONS

N/A

BACKGROUND

The present invention is generally directed to USB device redirection in a virtual desktop infrastructure (VDI) environment. USB device redirection generally refers to making a USB device that is connected to a client accessible within a virtual desktop as if the USB device had been physically connected to the virtual desktop. In other words, when USB device redirection is implemented, a user can connect a USB device to his or her client terminal and the USB device will function as if it had been connected to the server.

FIGS. 1 and 2 and the following description will provide a general overview of how USB device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client, the desktop running on server 104 may represent a virtual desktop environment.

FIG. 2 is a block diagram of a local device virtualization system 200 in accordance with embodiments of the present invention. System 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2. Server 104 may include an agent 250 and a virtual bus driver 260.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102). For purposes of this application, device 240 can represent an authentication device such as a smart card.

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 104. Device 240 may be accessed from server 104 when client 102 is connected to server 104 through a remote session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106 (e.g., via a TCP or UDP socket). Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a remote session through which client 102 is connected to server 104, such as a session number or a session locally unique identifier (LUID). Agent 250 can provide notification of device 240, along with the device information, to virtual bus driver 260. Virtual bus driver 260 (which may be a Dell Wyse TCX USB bus driver, or any other bus driver) may be configured to create and store in memory a record corresponding to device 240. This record may include at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281a, 281b, ..., 281n, referred to generally as device object(s) 281), as illustratively shown in FIG. 2. A device object 281 is a software implementation of a real device 240 or a virtualized (or conceptual) device 290. Different device objects 281 layer over each other to provide the complete functionality. The different device objects 281 are associated with different device drivers (driver(s) 282a, 282b, ... 282n, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281a stating that a new device has been plugged in. Next, a plug-and-play (PNP) component of the operating system will search for and load the best driver for device 240, which will create another device object 281b that is layered over the previous device object 281a. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a remote session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device 240 itself or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

The USB standard provides for a number of different types of data transfers including control, isochronous, interrupt and bulk transfers. Bulk transfers, which are typically used for large bursts of data, are oftentimes preferred because of error-correction capabilities and guaranteed delivery. Other types of transfers are given priority over bulk transfers, and therefore, bulk transfers are typically employed on devices that are not time sensitive (e.g., printers, scanners, signature pads, skimmers, and other HID devices).

Bulk transfers are performed via a unidirectional bulk endpoint. When the host (e.g., application 270) desires to read data from a bulk endpoint (or a "Bulk-In endpoint") of a USB device, it issues a bulk read request (e.g., in the form of an IN packet or ACK packet). In response, if the bulk endpoint has data, it will return a data packet containing that data, whereas, if the bulk endpoint does not have data or is not yet ready to send data, it notifies the host to try again later (e.g., via a NAK or ERDY packet). Accordingly, data will only be transferred from the USB device to the host if the host sends a bulk read request to the bulk endpoint.

With bulk transfers, it is possible that the USB device may produce data faster than the host reads it. In particular, a bulk endpoint will employ a buffer on the USB device to store the data prior to transferring it to the host. With many USB devices, the size of these buffers is limited. Therefore, if the host does not read the data in a timely manner (e.g., within 5 ms of the data being stored in the buffer), the data may be overwritten by newly generated data. Even if the data is not overwritten, a delay in reading the data from the bulk endpoint can degrade the performance of the USB device. In a redirection scenario, if the network connection between proxy 210 and agent 250 has latency or bandwidth issues, such delays are likely.

U.S. Pat. Pub. No.: 2009/0222841 (the '841 Publication) describes a technique for keeping one or more IRPs pending with the host controller driver to thereby accelerate the delivery of data from a bulk endpoint. However, the technique described in the '841 Publication is only applicable to scenarios where the USB device is connected locally to a computing device running the Windows operating system. This technique therefore cannot be used in a redirection scenario (e.g., within local device virtualization system 200), including, but not limited to, scenarios where client terminal 102 runs a non-Windows operating system.

BRIEF SUMMARY

The present invention extends to methods, systems, and computer program products for providing a read-ahead mechanism for a redirected Bulk-In endpoint of a USB device. When a USB device is redirected to a server, an agent running on the server can evaluate the USB device's descriptors to determine whether it has any Bulk-In endpoints and whether any Bulk-In endpoint is part of a mass storage interface. For any Bulk-In endpoint that is not part of a mass storage interface, the agent can create a circular buffer and commence originating bulk read requests on the server and then redirecting the bulk read requests to a client-side proxy for delivery to the Bulk-In endpoint. The agent can then store the data it obtains from these bulk read requests in the circular buffer. By repeatedly sending the bulk read requests to the Bulk-In endpoint, the agent ensures that data will be read from the Bulk-In endpoint in a timely manner.

While originating and redirecting bulk read requests, the agent can also receive bulk read requests that were originated by another server-side component and that target the Bulk-In endpoint. In response, the agent can complete these bulk read requests using data that was stored in the circular buffer. In instances where the network connection between the server-side agent and the client-side proxy has high latency and/or low bandwidth, this process of originating bulk read requests to fill the circular buffer can be performed by the client-side proxy.

In some embodiments, the present invention is implemented by the agent as a method for executing a read-ahead mechanism to ensure that data is read in a timely manner from a bulk interface of a USB device that is redirected from the client to the server. The agent receives a notification from the proxy that identifies that a USB device is connected to the client. In conjunction with causing the USB device to be redirected to the server, the agent evaluates the notification to determine whether the USB device includes a Bulk-In endpoint. Upon determining that the USB device includes a Bulk-In endpoint, the agent creates a buffer for storing data that is read from the Bulk-In endpoint. The agent repeatedly generates and redirects bulk read requests to the proxy to cause the bulk read requests to be submitted to the Bulk-In endpoint. Upon receiving data from the Bulk-In endpoint in response to each of the bulk read requests that the agent generated, the agent stores the data in the buffer. Upon receiving a bulk read request that was generated by another server-side component, the agent completes the bulk read request using the data stored in the buffer.

In another embodiment, the present invention is implemented as a method for ensuring that data is read from a redirected Bulk-In endpoint of a USB device. The agent determines that a Bulk-In endpoint of a USB device connected to a client is redirected for access within a remote session on the server, and then creates a buffer for storing data read from the Bulk-In endpoint. The agent repeatedly generates and redirects bulk read requests to a proxy on the client. In response to the bulk read requests, the agent receives data that was read from the Bulk-In endpoint and stores the data read from the Bulk-In endpoint in the buffer. The agent also receives a first bulk read request that was generated by another server-side component and that targets the Bulk-In endpoint, and forgoes redirection of the first bulk read request to the proxy by completing the first bulk read request using data that was stored in the buffer.

In another embodiment, the present invention is implemented by a proxy as a method for executing a read-ahead mechanism to ensure that data is read in a timely manner from a bulk interface of a USB device that is redirected from the client to the server. In conjunction with establishing or maintaining a remote session on the server while a USB device is connected to the client, the proxy redirects a Bulk-In endpoint of the USB device to the server. The proxy also creates a buffer for storing data that is read from the Bulk-In endpoint, and repeatedly generates and submits bulk read requests to the Bulk-In endpoint. Upon receiving data from the Bulk-In endpoint in response to each of the bulk read requests that the proxy generated, the proxy stores the data in the buffer. The proxy also receives a first bulk read request from the agent. The first bulk read request was generated by another server-side component. The proxy reads data from the buffer and sends the data to the agent rather than submitting the first bulk read request to the Bulk-In endpoint. The agent then completes the first bulk read request using the data sent by the proxy.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
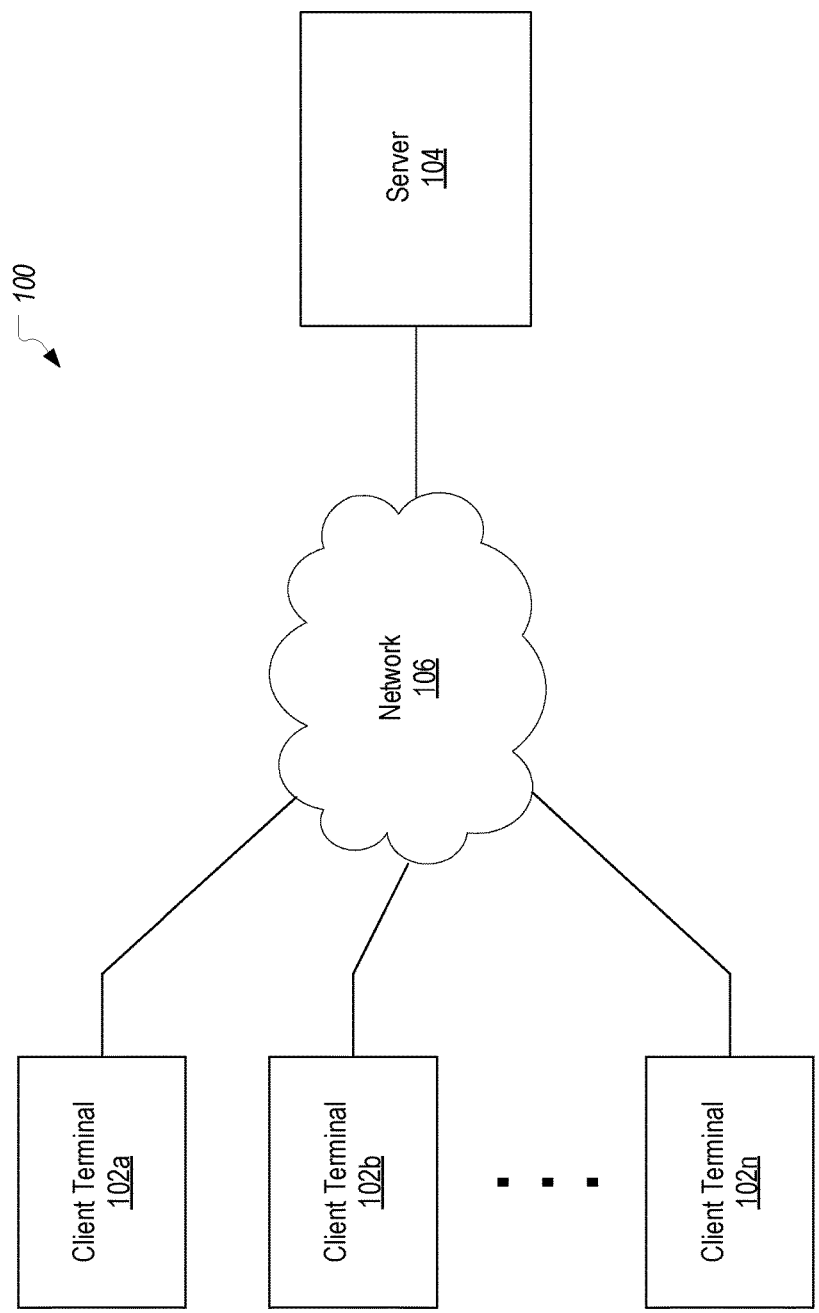
FIG. 1 illustrates an example computing environment in which the present invention can be implemented.
Figure 2:
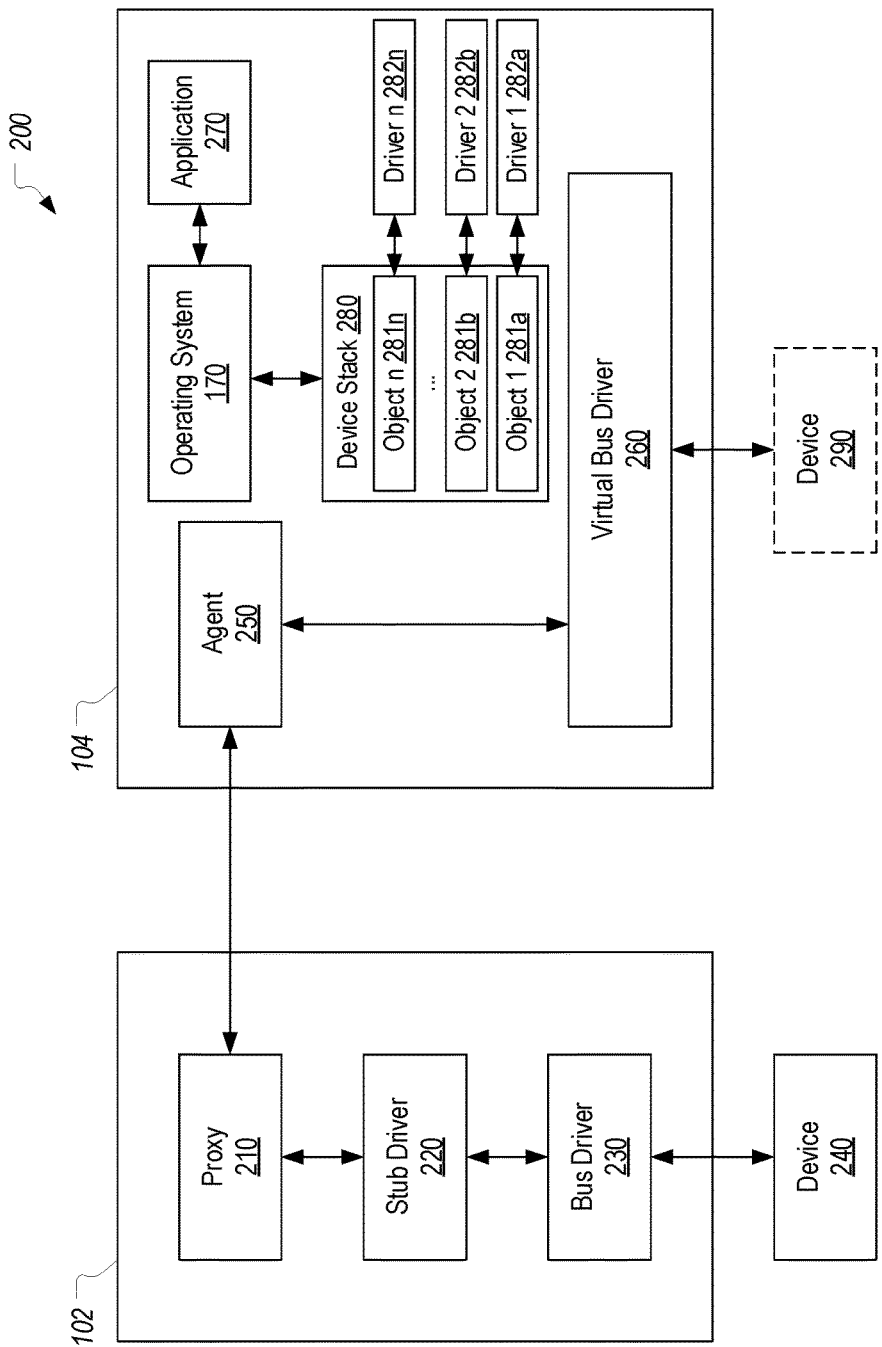
FIG. 2 illustrates how a USB device can be redirected from a client terminal to a server.

In accordance with embodiments of the present invention, agent 250 (and in some cases, proxy 210) can be configured to implement a read-ahead mechanism for a redirected bulk endpoint of a USB device. This read-ahead mechanism can ensure that data will be read from the bulk endpoint in a timely manner even when a high latency or low bandwidth connection exists between agent 250 and proxy 210. FIGS. 3A-3E and 4A-4B illustrate how agent 250 can implement this read-ahead mechanism. These figures are based on the architecture shown in FIG. 2 with various components removed to simplify the illustration.

Figure 3A:
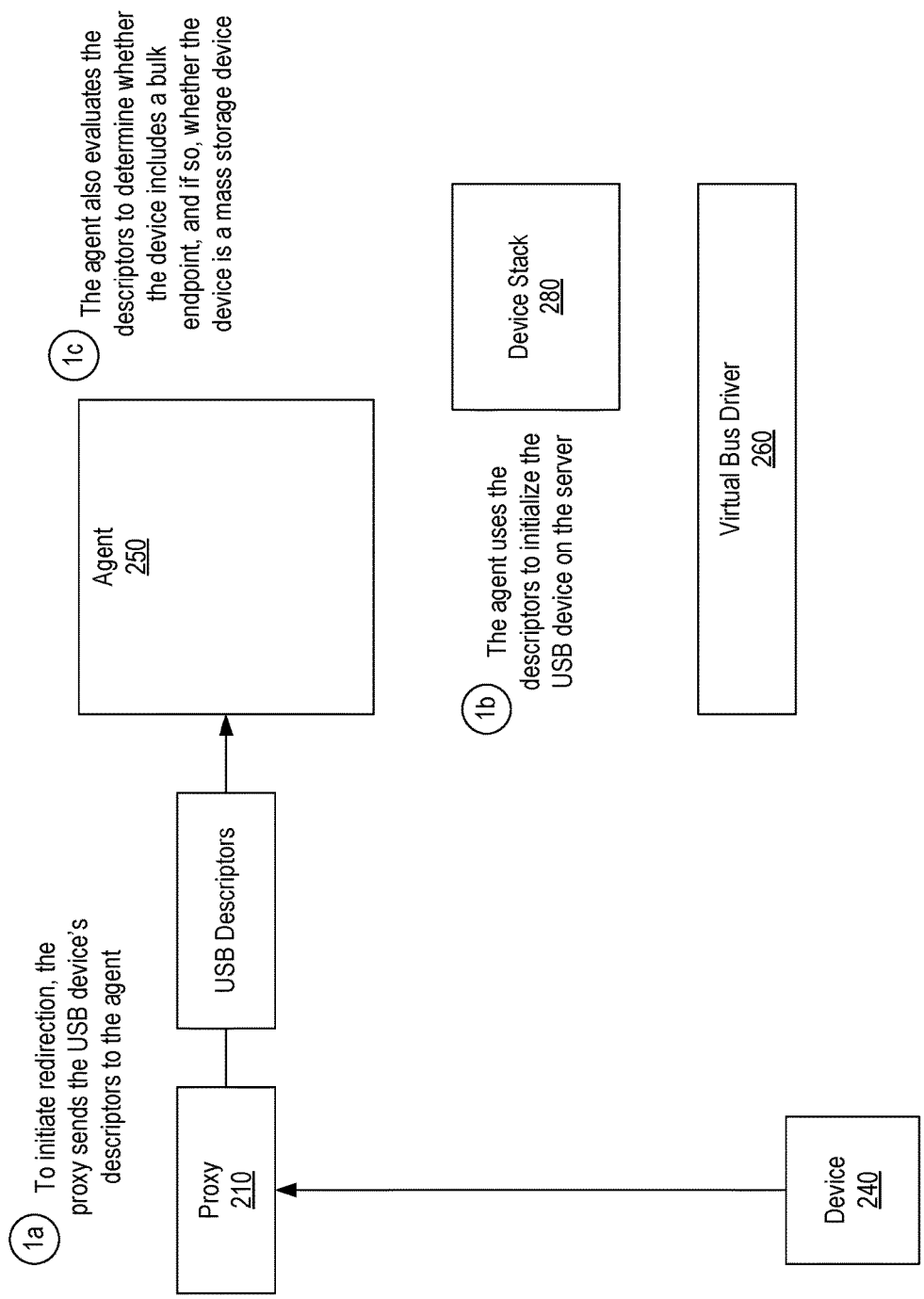
FIGS. 3A-3E illustrate a process by which a server-side agent originates and redirects bulk read requests to ensure that data is read from a redirected Bulk-In endpoint in a timely manner.

In FIG. 3A, it will be assumed that proxy 210 has communicated (or is communicating) with agent 250 to establish a remote session on server 104 and that proxy 210 is configured to redirect device 240 for use within the remote session. Accordingly, FIG. 3A includes step 1a in which proxy 210 sends USB descriptors to agent 250 as part of a device connect notification. These USB descriptors can include device descriptors, interface descriptors, endpoint descriptors, configuration descriptors, etc. In step 1b, agent 250 will employ these descriptors to initialize device 240 on server 104 which will result in device stack 280 being loaded. In conjunction with initializing device 240 on server 104, in step 1c, agent 250 can also evaluate the descriptors to determine whether device 240 includes a Bulk-In endpoint and, if so, whether the device is a mass storage device.

For example, agent 250 can evaluate each endpoint descriptor reported by proxy 210 to determine whether the bmAttributes field is set to 0x02 (Bulk) and whether bit 7 of the bEndpointAddress is set to 1 (In). If so, agent 250 can also evaluate the corresponding interface descriptor to determine whether the bInterfaceClass is set to 0x08 (mass storage). It is noted that mass-storage devices employ an additional protocol on top of bulk transfers and therefore the read-ahead mechanism is not applicable to Bulk-In endpoints of mass storage interfaces. For this reason, agent 250 can determine whether the bulk endpoint is part of a mass storage interface.

Figure 3B:
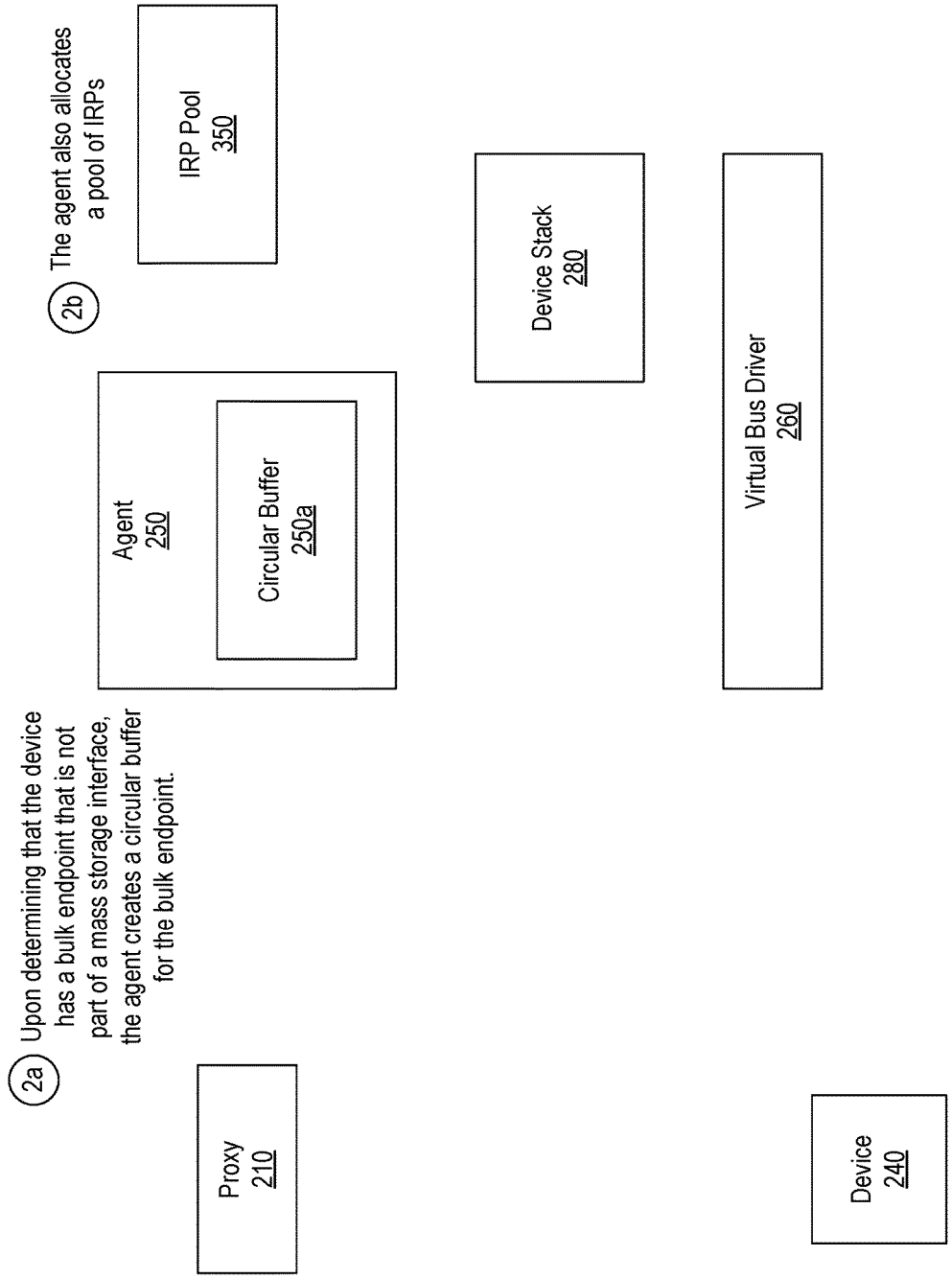

Turning to FIG. 3B, it will be assumed that device 240 includes a Bulk-In endpoint that is part of a non-mass storage interface and therefore agent 250 will determine that the Bulk-In endpoint can be optimized. Consequently, in step 2a, agent 250 creates a circular buffer 250a on server 104 that is specific to device 240's Bulk-In endpoint. Although not shown, device 240 could include more than one Bulk-In endpoint (or another USB device with a Bulk-In endpoint could be connected to client terminal 102 and redirected) in which case agent 250 could create a circular buffer for each Bulk-In endpoint. In conjunction with creating circular buffer 250a for the Bulk-In endpoint, in step 2b, agent 250 can also allocate a pool 350 of one or more I/O request packets (IRPs) (e.g., by calling ExAllocatePoolWithTag and then allocating IRPs from the memory pool). Agent 250 can use IRPs from IRP pool 350 to send bulk read requests to the Bulk-In endpoint.

At this point, agent 250 can commence repeatedly sending bulk read requests to the Bulk-In endpoint of device 240. In some embodiments, agent 250 can commence doing so immediately after creating circular buffer 250a, whereas in other embodiments, agent 250 may wait for some trigger to commence sending the bulk requests. For example, agent 250 may wait until an application or other component on server 104 commences sending bulk read requests to the Bulk-In endpoint such that agent 250 only commences implementing the read-ahead mechanism once device 240 is actively being used.

Figure 3C:
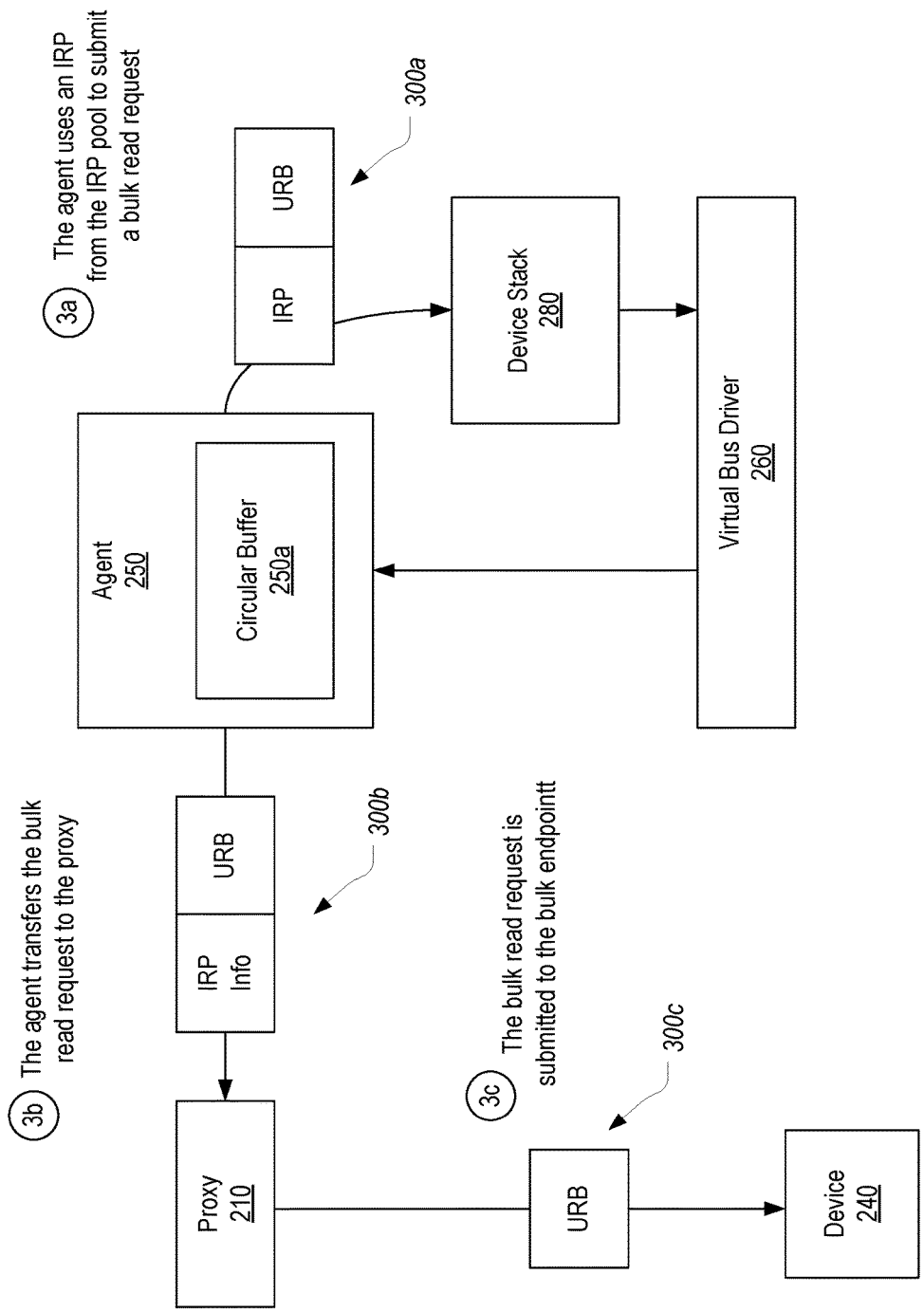

In any case, in step 3a shown in FIG. 3C, agent 250 can employ an IRP from IRP pool 350 to submit a USB request block (URB) to device stack 280 to cause a bulk read request 300a to be sent to the Bulk-In endpoint. Agent 250 can do so by setting the MajorFunction and Parameters.DeviceIoControl.IoControlCode members of the IO_STACK_LOCATION structure of the IRP to IRP_MJ_INTERNAL_DEVICE_CONTROL and IOCTL_INTERNAL_USB_SUBMIT_URB respectively, and by structuring the URB as a _URB_BULK_OR_INTERRUPT_TRANSFER structure with the Function member of the URB header set to URB_FUNCTION_BULK_OR_INTERRUPT_TRANSFER among other things. Agent 250 can also set a completion routine such as by calling IoSetCompletionRoutineEx. Agent 250 can then forward the IRP/URB to the next lower driver in device stack 280 by calling IoCallDriver.

As a result of step 3a, bulk read request 300a (in the form of an IRP and associated URB) will be passed down device stack 280 until it reaches virtual bus driver 260. Virtual bus driver 260 will determine that bulk read request 300a targets a redirected device and will therefore route (or redirect) the request to agent 250. Next, in step 3b, agent 250 will send a communication 300b representing bulk read request 300a to proxy 210 by sending the URB and IRP information representing the server-side IRP. This IRP information will allow proxy 210 to create an equivalent request 300c on client terminal 102 for submitting the URB to the Bulk-In endpoint. It is noted that the server-side IRP will remain pending.

In embodiments where client terminal 102 runs Windows, creating an equivalent request 300c can include creating an equivalent IRP and associating the IRP with the URB received from agent 250 (i.e., an URB initialized on the client that includes identical content). In contrast, in embodiments where client terminal 102 runs Linux (or another non-Windows operating system), creating an equivalent request 300c may entail populating an URB structure on the client with the content of the URB received from agent 250 and other necessary content. In any case, in step 3c, the URB of equivalent request 300c can be submitted to the Bulk-In endpoint of device 240 (whether via Windows-based IRP techniques, Linux techniques or techniques of another operating system) to retrieve whatever data the Bulk-In endpoint may have available.

Figure 3D:
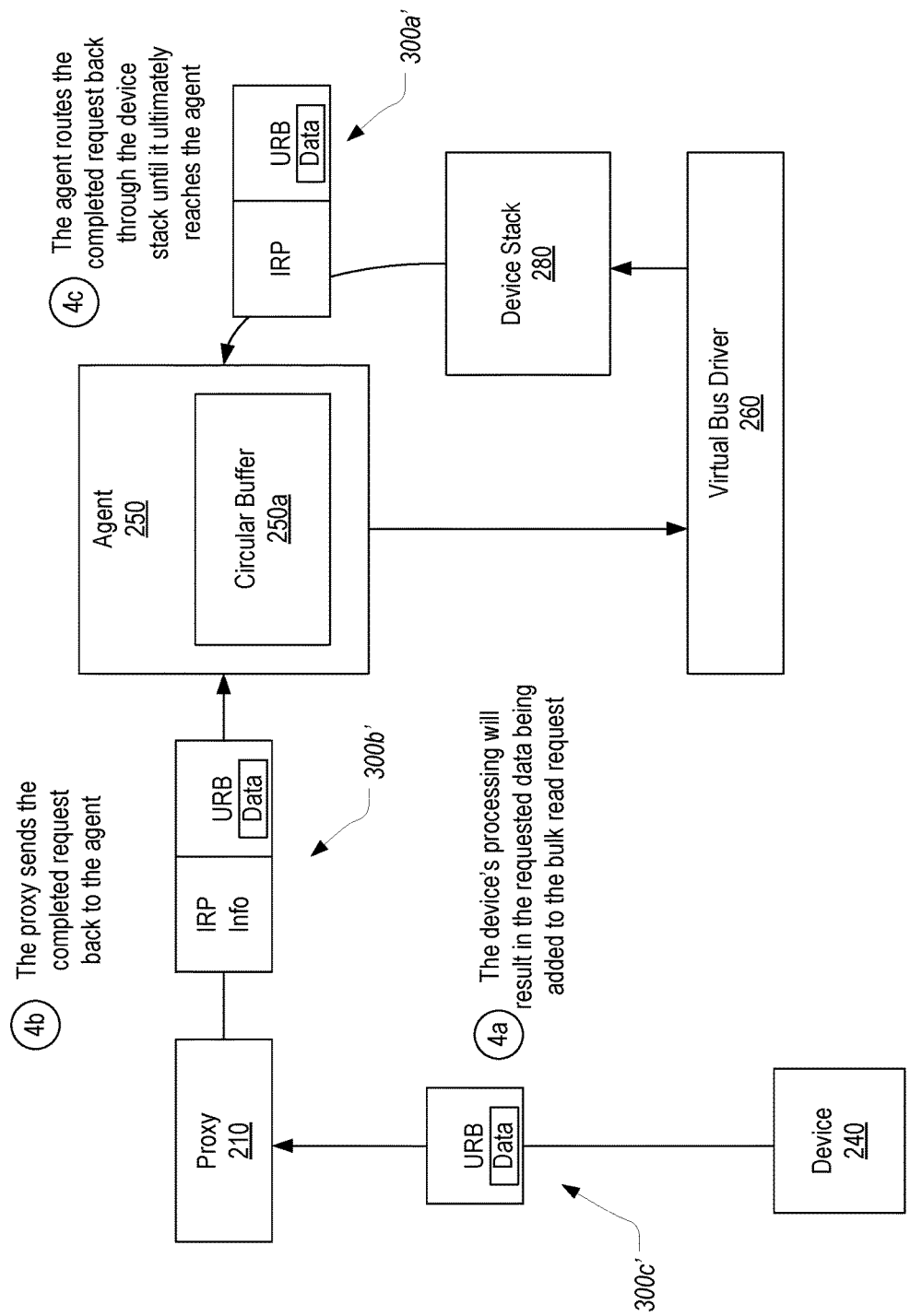

Turning to FIG. 3D and assuming the Bulk-In endpoint has data available to be read, the device's processing of the URB will result in the data being stored in the URB (e.g., in the TransferBuffer) in step 4a, and then the completed equivalent request 300c' will be routed back to proxy 210. In step 4b, proxy 210 returns communication 300b' which includes the IRP info (or information sufficient to identify the pending server-side IRP) and the URB with the data to agent 250. Upon receipt, agent 250 will cause the data to be populated into the URB of the pending server-side IRP and then route the completed bulk read request 300a' back up device stack 280. Because agent 250 set a completion routine, this IRP will be passed to agent 250 after it has ascended device stack 280.

Figure 3E:
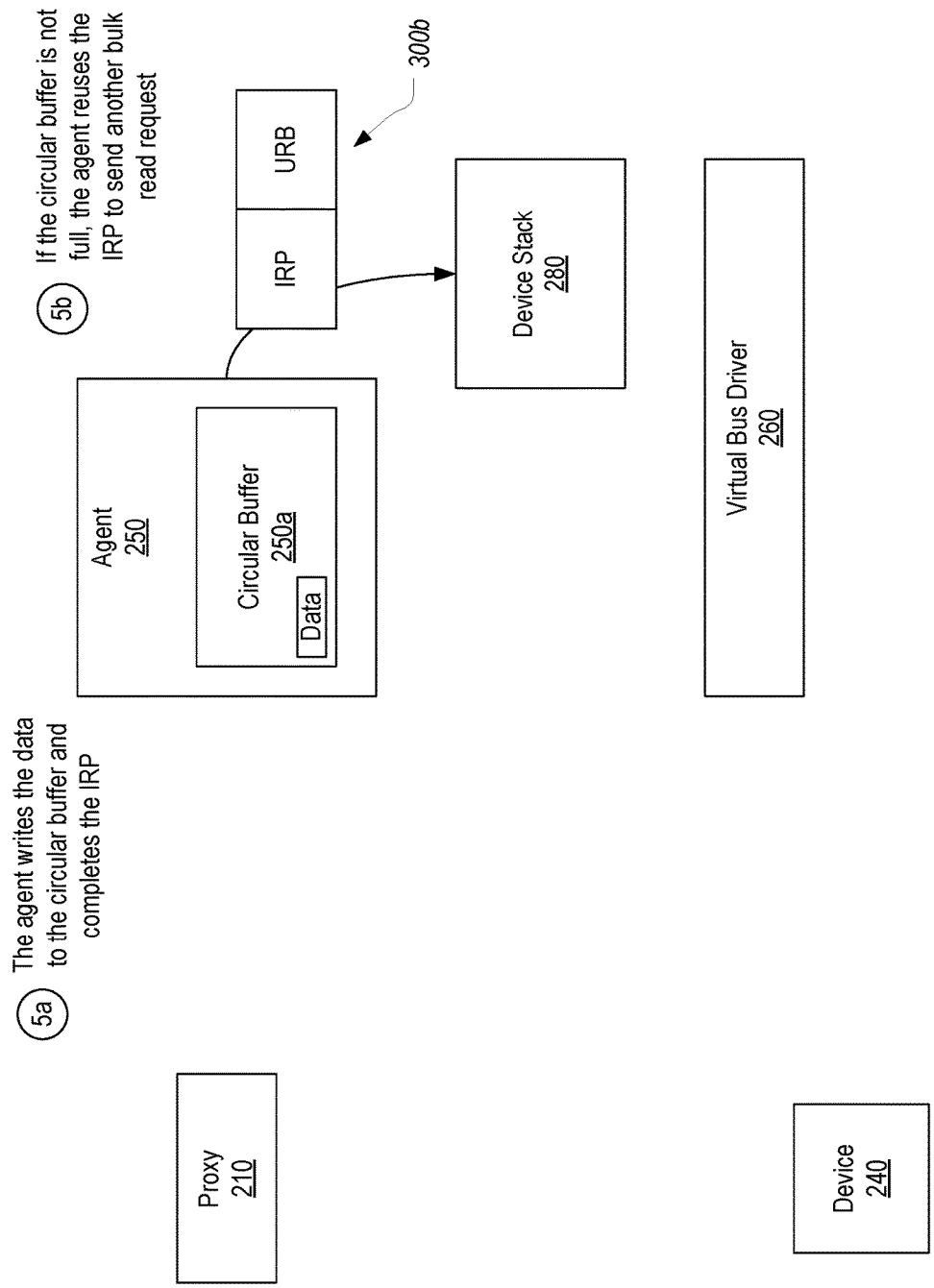

Finally, as shown in FIG. 3E and step 5a, agent 250 will extract the data from the URB, write it to circular buffer 250a and complete the IRP. Then, in step 5b, if circular buffer 250a is not full, agent 250 can reuse the IRP (or possibly another IRP from IRP pool 350, for example, by calling IoInitializeIrp or IoReuseIrp) to repeat the process of submitting a bulk read request to the Bulk-In endpoint (e.g. in the form of bulk read request 300b). As mentioned above, agent 250 can repeat this process so that data is consistently being read from the Bulk-In endpoint. As a result, it will be less likely that data available to be read from the Bulk-In endpoint will be overwritten due to a failure to read the data in time. It is noted that, if circular buffer 250a becomes full (e.g., if the amount of buffered data exceeds a defined threshold), agent 250 can cease sending bulk read requests until there is again sufficient room in the circular buffer for new data (which would occur as other server-side components submit bulk read requests as will be described below).

Figure 4A:
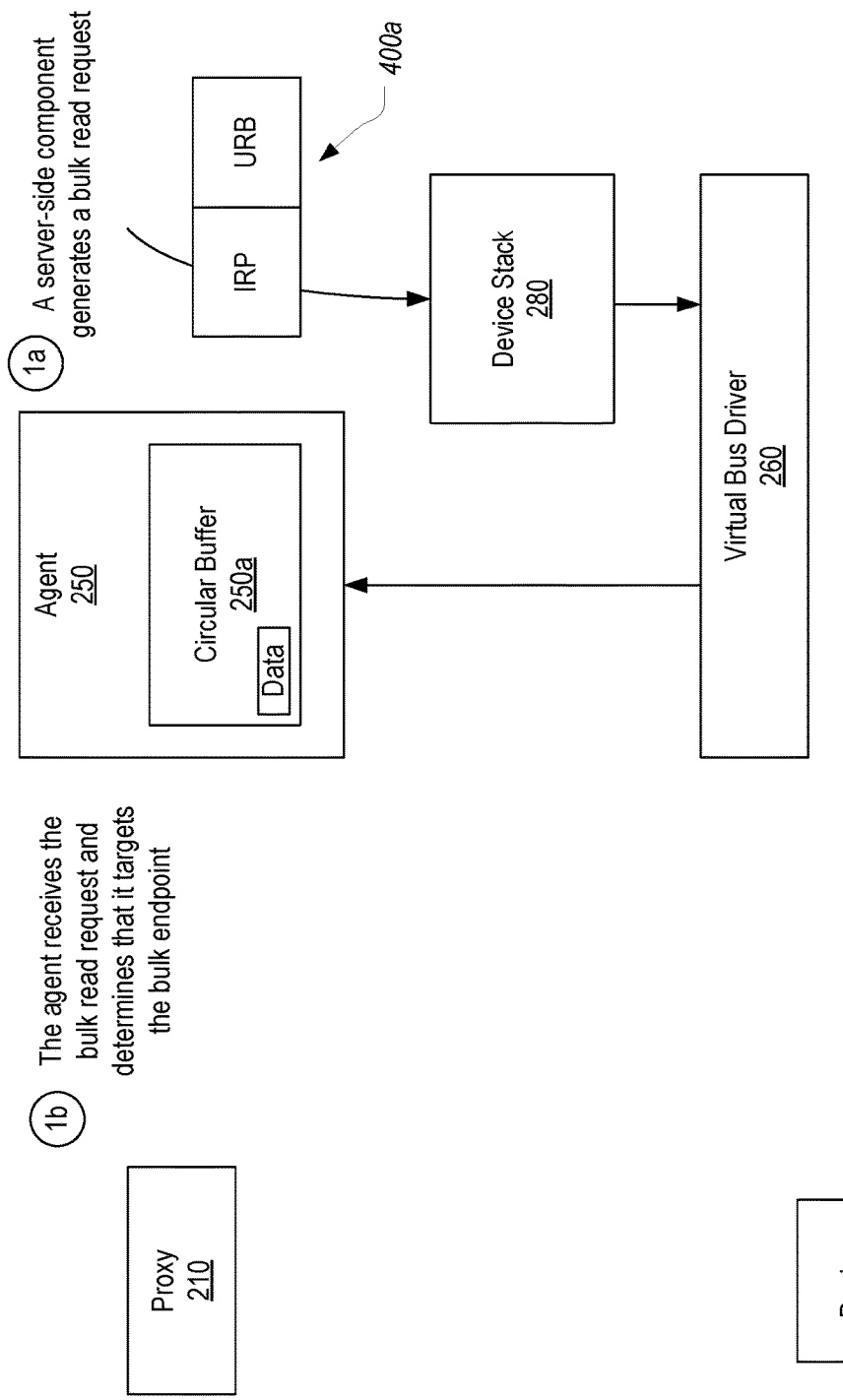
FIGS. 4A-4B illustrate a process by which the server-side agent completes bulk read requests, which were originated by another server-side component, using data that the agent had stored in the circular buffer.
Figure 4B:
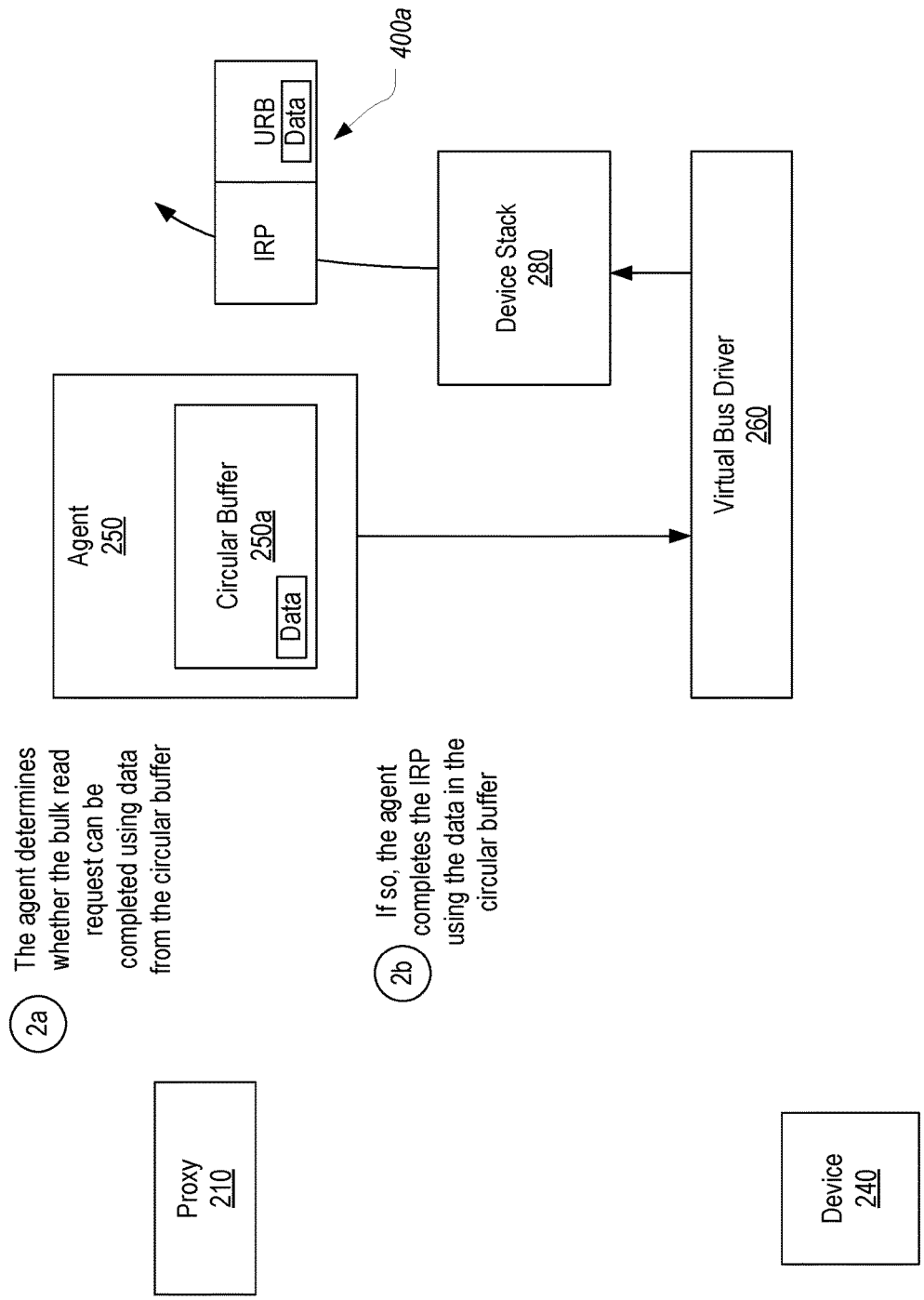

As agent 250 performs this repeated process of reading data from the Bulk-In endpoint, applications or other components on server 104 may also be submitting bulk read requests to the Bulk-In endpoint. FIGS. 4A and 4B illustrate how agent 250 integrates the processing of such requests into the read-ahead mechanism. As shown in step 1a of FIG. 4A, a server-side component (e.g., an application or a client driver) can send a bulk read request 400a targeting the Bulk-In endpoint of device 240 by creating an URB and associating it with an IRP. In a similar manner as described above, bulk read request 400a will be forwarded to device stack 280 and, because it targets device 240, will be redirected to agent 250. In step 1b, agent 250 evaluates bulk read request 400a to determine that it targets the Bulk-In endpoint for which circular buffer 250a was created.

Turning to FIG. 4B, in step 2a, agent 250 determines whether bulk read request 400a can be completed using data that is stored in circular buffer 250a. For example, agent 250 can determine whether circular buffer 250a includes any unread data. If bulk read request 400a can be completed from circular buffer 250a, agent 250 adds the data from circular buffer 250a to the URB of bulk read request 400a and completes the IRP step 2b. In contrast, if it cannot complete bulk read request 400a from data in circular buffer 250a, agent 250 can forward the bulk read request onto proxy 210 so that the requested data is read directly from the Bulk-In endpoint in a similar manner as shown in FIGS. 3C and 3D except that the completed request will be routed back to the requesting server-side component that originated bulk read request 400a.

In short, agent 250 can selectively route a bulk read request to proxy 210 depending on whether the request can be completed using data stored in circular buffer 250a. In practice, this read-ahead mechanism should ensure that bulk read requests that are not originated by agent 250 can be completed from data in circular buffer 250a rather than by sending the bulk read requests over the network connection between agent 250 and proxy 210. Additionally, by originating bulk read requests, agent 250 can ensure that data is read from the Bulk-In endpoint of the redirected device in a timely manner. Importantly, agent 250 accomplishes this in a manner that is independent of the client-side operating system.

Figure 5:
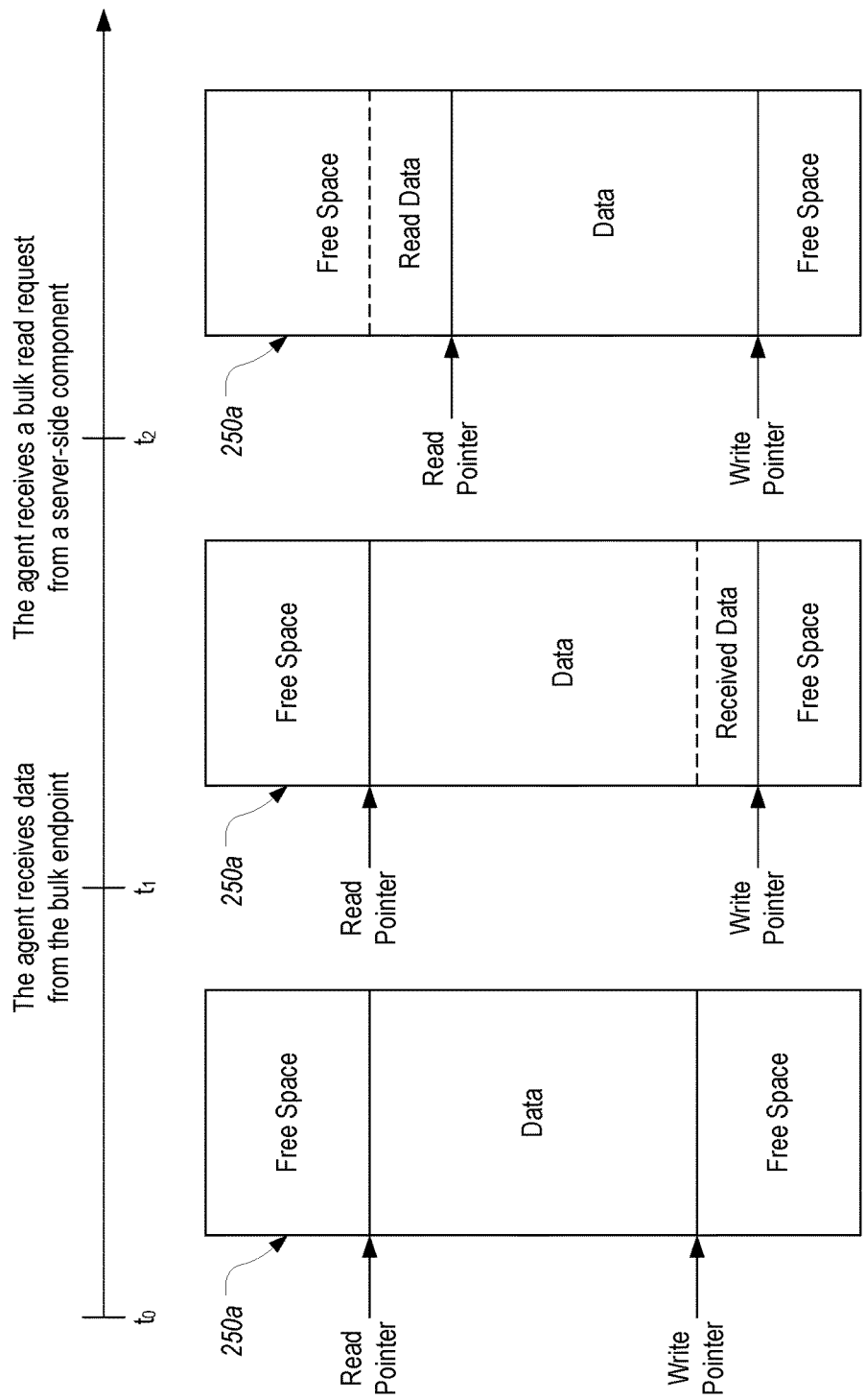
FIG. 5 provides an example of how the server-side agent can manage the read and write pointers as data is written to and read from the circular buffer.

FIG. 5 provides a timeline representation of how agent 250 can manage circular buffer 250a. As shown, agent 250 can maintain a read pointer which identifies the location within circular buffer 250a where the to-be-read data begins and a write pointer which identifies the location within circular buffer 250a where the written data ends. More specifically, when agent 250 completes a bulk read request that it originated (e.g., at time $t_1$), it will add the data to circular buffer 250a and update the write pointer appropriately, whereas, when agent 250 completes a bulk read request that another component originated (e.g., at time $t_2$), it will read data from circular buffer 250a commencing at the read pointer and update the read pointer appropriately.

In some cases, step 4c in FIG. 3D and step 1b in FIG. 4A may overlap. In other words, agent 250 may receive a bulk read request that originated from a server-side component upon receiving data from the Bulk-In endpoint but prior to writing the data to circular buffer 250a. In such cases, agent 250 can complete the bulk read request that originated from the server-side component using the data it has received and then write any additional data to circular buffer 250a. For example, the length of the data received from the Bulk-In endpoint may exceed the length of data that the server-side component requested (i.e., it may exceed the size of the URB's buffer). Accordingly, in such cases, agent 250 may write to circular buffer 250a only a portion of the data it receives from the Bulk-In endpoint in response to a bulk read request that agent 250 originated.

Figure 6:
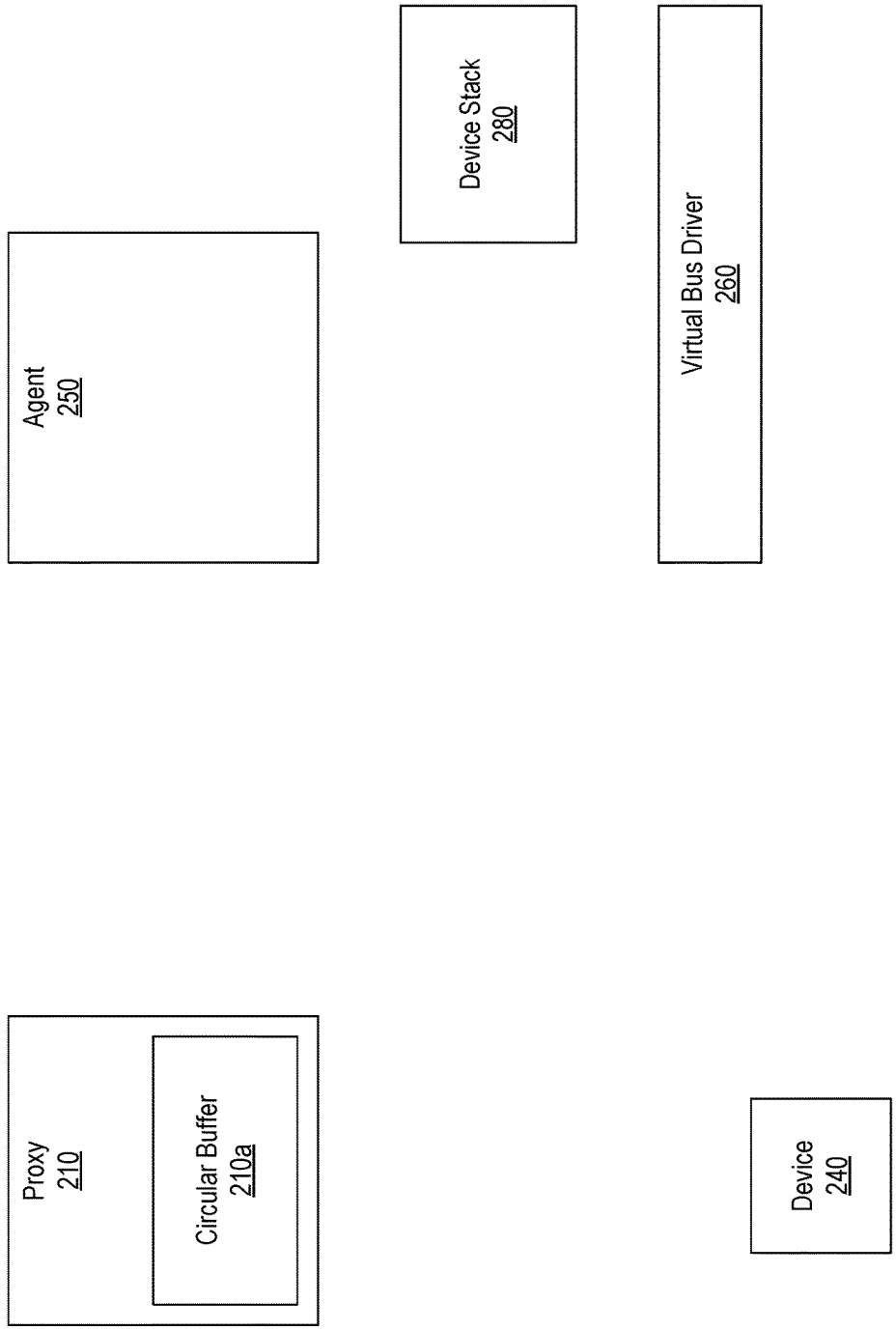
FIG. 6 illustrates how the process of originating bulk read requests targeting a redirecting Bulk-In endpoint to fill a circular buffer can be performed by the client-side proxy.

In some environments, even when agent 250 implements the read-ahead mechanism, the high latency and/or low bandwidth of the network connection between agent 250 and proxy 210 may still prevent data from being read from the Bulk-In endpoint in a timely manner. To address such environments, proxy 210, rather than agent 250, may implement the read-ahead mechanism. For example, as shown in FIG. 6, proxy 210 may maintain a circular buffer 210a and may employ circular buffer 210a to repeatedly submit bulk read requests to the Bulk-In endpoint in a similar manner as described above. If client terminal 102 runs Windows, proxy 210 may employ an IRP pool from which it can quickly create an IRP whenever it receives a bulk read request from agent 250. Similarly, if client terminal 102 runs Linux, proxy 210 may maintain a memory pool from which it can quickly build URBs.

In some embodiments, agent 250 may be configured to monitor network conditions or delays in receiving data from the Bulk-In endpoint and can dynamically transition the implementation of the read-ahead mechanism to proxy 210. For example, while implementing the read-ahead mechanism as shown in FIGS. 3A-4B, agent 250 may detect that network conditions are preventing data from being read from the Bulk-In endpoint in a timely manner. In response, agent 250 can send a notification to proxy 210 instructing it to commence submitting bulk read requests to the Bulk-In endpoint and storing the data in circular buffer 210a. During this transition, agent 250 can continue to complete bulk read requests from circular buffer 250a until all data has been read from the circular buffer. Once all data has been read from circular buffer 250a, agent 250 can notify proxy 210 to commence completing bulk read requests using the data in circular buffer 210a. In some embodiments, the implementation of the read-ahead mechanism may be transitioned back to agent 250 once/if network conditions improve.

In embodiments where the read-ahead mechanism is implemented on agent 250, the client-side handling of bulk read requests will not be altered. In other words, the present invention can be implemented in a manner that is transparent to proxy 210 and the other client-side components. Similarly, the read-ahead mechanism is implemented independently of the USB host controller since the redirection occurs at the level of virtual bus driver 260. For these reasons, the read-ahead mechanism can be seamlessly integrated into a VDI environment that may employ client terminals running a variety of operating systems. The implementation of the read-ahead mechanism is also entirely agnostic to the remoting protocol that may be used by proxy 210 and agent 250 to establish a remote session. Finally, the read-ahead mechanism can be used with any Bulk-In endpoint of any type of USB device including both simple and composite devices.

Figure 7:
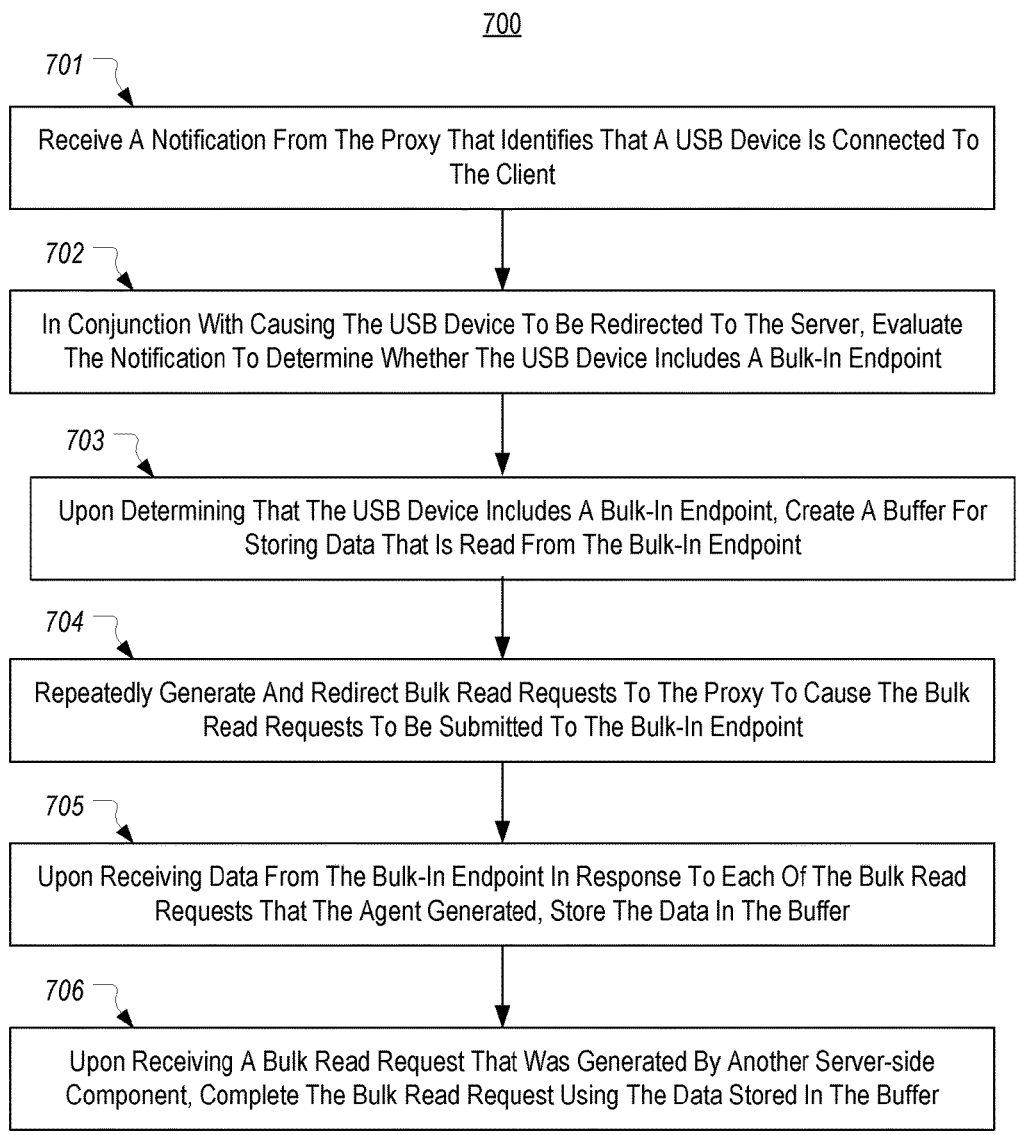
FIG. 7 provides a flowchart of an example method for implementing a read-ahead mechanism in a VDI environment.

FIG. 7 provides a flowchart of an example method 700 for implementing a read-ahead mechanism to ensure that data is read in a timely manner from a bulk interface of a USB device that is redirected from the client to the server. Method 700 can be implemented by agent 250.

Method 700 includes an act 701 of receiving a notification from the proxy that identifies that a USB device is connected to the client. For example, agent 250 can receive USB descriptors of device 240 when device 240 is redirected to server 104.

Method 700 includes an act 702 of, in conjunction with causing the USB device to be redirected to the server, evaluating the notification to determine whether the USB device includes a Bulk-In endpoint. For example, agent 250 can evaluate an endpoint descriptor contained within the USB descriptors.

Method 700 includes an act 703 of, upon determining that the USB device includes a Bulk-In endpoint, creating a buffer for storing data that is read from the Bulk-In endpoint. For example, agent 250 can create circular buffer 250a.

Method 700 includes an act 704 of repeatedly generating and redirecting bulk read requests to the proxy to cause the bulk read requests to be submitted to the Bulk-In endpoint. For example, agent 250 can generate and send bulk read requests 300a, 300b and redirect them to proxy 210.

Method 700 includes an act 705 of, upon receiving data from the Bulk-In endpoint in response to each of the bulk read requests that the agent generated, storing the data in the buffer. For example, agent 250 can store data received from proxy 210 in response to bulk read requests 300a, 300b in circular buffer 250a.

Method 700 includes an act 706 of, upon receiving a bulk read request that was generated by another server-side component, completing the bulk read request using the data stored in the buffer. For example, agent 250 can complete bulk read request 400a using data stored in circular buffer 250a.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented in a virtual desktop infrastructure (VDI) environment that includes a server-side agent and a client-side proxy that interact to establish a remote session on the server, by which the server-side agent implements a read-ahead mechanism to ensure that data is read in a timely manner from a bulk interface of a USB device that is redirected from the client to the server, the method comprising:
  receiving a notification from the client-side proxy that identifies that a USB device is connected to the client;
  in conjunction with causing the USB device to be redirected to the server, evaluating the notification to determine whether the USB device includes a Bulk-In endpoint;
  upon determining that the USB device includes a Bulk-In endpoint, creating a buffer for storing data that is read from the Bulk-In endpoint;
  repeatedly generating and redirecting bulk read requests to the client-side proxy to cause the bulk read requests to be submitted to the Bulk-In endpoint;
  upon receiving data from the Bulk-In endpoint in response to each of the bulk read requests that the server-side agent generated, storing the data in the buffer; and
  upon receiving a bulk read request that was generated by another server-side component, completing the bulk read request using the data stored in the buffer.

2. The method of claim 1, wherein evaluating the notification to determine whether the USB device includes a Bulk-In endpoint comprises evaluating an endpoint descriptor included in the notification.

3. The method of claim 1, wherein the server-side agent creates the buffer for storing data that is read from the Bulk-In endpoint only upon determining that the Bulk-In endpoint is not part of a mass storage interface.

4. The method of claim 1, wherein the buffer is a circular buffer.

5. The method of claim 4, wherein creating the buffer includes creating a read pointer and a write pointer, the method further comprising:
  in conjunction with storing the data in the buffer, updating the write pointer.

6. The method of claim 5, further comprising:
  in conjunction with completing the bulk read request using the data stored in the buffer, updating the read pointer.

7. The method of claim 1, further comprising:
  pausing the repeated generation and redirection of the bulk read requests when an amount of data in the buffer exceeds a threshold.

8. The method of claim 7, further comprising:
  resuming the repeated generation and redirection of the bulk read requests when the amount of data in the buffer no longer exceeds the threshold.

9. The method of claim 1, wherein repeatedly generating and redirecting bulk read requests to the client-side proxy to cause the bulk read requests to be submitted to the Bulk-In endpoint comprises routing the bulk read requests through a virtual bus driver on the server.

10. The method of claim 1, further comprising:
  receiving data from the Bulk-In endpoint in response to a first bulk read request that the server-side agent generated;
  receiving a second bulk read request that was generated by another server-side component; and
  completing the second bulk read request using the data of the first bulk read request without first storing the data in the buffer.

11. The method of claim 10, wherein the data used to complete the second bulk read request is a first portion of the data of the first bulk read request, the method further comprising:
  storing a second portion of the data of the first bulk read request in the buffer, the first portion and the second portion being distinct portions of the data of the first bulk read request.

12. The method of claim 1, wherein repeatedly generating bulk read requests comprises reusing I/O requests packets (IRPs).

13. The method of claim 1, further comprising:
  determining that data is not being read from the Bulk-in endpoint in a timely manner;
  instructing the client-side proxy to create a second buffer for storing data that is read from the Bulk-In endpoint and to commence repeatedly generating bulk read requests to obtain data from the Bulk-In endpoint for storage in the second buffer; and
  ceasing the repeated generation and redirection of the bulk read requests.

14. One or more computer storage media storing computer-executable instructions which, when executed by one or more processors in a virtual desktop infrastructure (VDI) environment, implement a method for ensuring that data is read from a redirected Bulk-In endpoint of a USB device, the method comprising:
  determining, by a server-side agent, that a Bulk-In endpoint of a USB device connected to a client is redirected for access within a remote session on the server;
  creating, by the server-side agent, a buffer for storing data read from the Bulk-In endpoint;
  repeatedly generating and redirecting bulk read requests to a client-side proxy on the client;
  in response to the bulk read requests, receiving, by the server-side agent, data that was read from the Bulk-In endpoint;
  storing, by the server-side agent, the data read from the Bulk-In endpoint in the buffer;
  receiving, by the server-side agent, a first bulk read request that was generated by another server-side component and that targets the Bulk-In endpoint; and
  forgoing redirection of the first bulk read request to the client-side proxy by completing the first bulk read request using data that was stored in the buffer.

15. The computer storage media of claim 14, wherein repeatedly generating and redirecting bulk read requests to the client-side proxy comprises routing the bulk read requests through a virtual bus driver on the server.

16. The computer storage media of claim 14, wherein repeatedly generating and redirecting bulk read requests to the client-side proxy comprises reusing one or more I/O request packets (IRPs) on the server.

17. The computer storage media of claim 14, wherein the method further comprises:
  receiving data that was read from the Bulk-In endpoint in response to a bulk read request that was generated by the serve-side agent;
  receiving a second bulk read request that was generated by another server-side component; and
  completing the second bulk read request using the data that was read from the Bulk-In endpoint in response to the bulk read request that was generated by the server-side agent without first storing the data in the buffer.

18. The computer storage media of claim 14, wherein the method further comprises:

generating, by the client-side proxy and for each redirected bulk read request, an equivalent request on the client terminal; and causing the equivalent request to be submitted to the Bulk-In endpoint.

19. The computer storage media of claim 18, wherein:

the equivalent request is a USB request block (URB); or the equivalent request is an URB and an I/O request packet (IRP).

20. A method, implemented in a virtual desktop infrastructure (VDI) environment that includes a server-side agent and a client-side proxy that interact to establish a remote session on the server, by which a read-ahead mechanism is implemented to ensure that data is read in a timely manner from a bulk interface of a USB device that is redirected from the client to the server, the method comprising:

in conjunction with establishing or maintaining a remote session on the server while a USB device is connected to the client, redirecting, by the client-side proxy, a Bulk-In endpoint of the USB device to the server;

creating, by the client-side proxy, a buffer for storing data that is read from the Bulk-In endpoint;

the client-side proxy repeatedly generating and submitting bulk read requests to the Bulk-In endpoint;

upon receiving data from the Bulk-In endpoint in response to each of the bulk read requests that the client-side proxy generated, storing the data in the buffer;

receiving, by the client-side proxy, a first bulk read request from the server-side agent, wherein the first bulk read request was generated by another server-side component;

reading, by the client-side proxy, data from the buffer and sending the data to the server-side agent rather than submitting the first bulk read request to the Bulk-In endpoint; and completing, by the server-side agent, the first bulk read request using the data sent by the client-side proxy.

* * * * *